United States Patent [19]
Nielsen

[11] Patent Number: 5,589,813
[45] Date of Patent: Dec. 31, 1996

[54] DATA COMMUNICATION SYSTEM OF THE FIELD BUS TYPE WITH A TWIN LEAD FOR POWER SUPPLY TO CONNECT UNITS AND FOR DATA TRANSMISSION BETWEEN THE UNITS

[76] Inventor: Ole C. Nielsen, Asger Jorns Vej 18, DK-8600 Silkeborg, Denmark

[21] Appl. No.: 211,703
[22] PCT Filed: Oct. 14, 1992
[86] PCT No.: PCT/DK92/00302
§ 371 Date: Apr. 13, 1994
§ 102(e) Date: Apr. 13, 1994
[87] PCT Pub. No.: WO93/08652
PCT Pub. Date: Apr. 29, 1993

[30] Foreign Application Priority Data

Oct. 14, 1991 [DK] Denmark ................................. 1732/91

[51] Int. Cl.$^6$ ................................................. H04M 11/04
[52] U.S. Cl. ................... 340/310.01; 340/310.02; 340/310.03; 340/310.06; 326/30
[58] Field of Search ..................... 340/310.01, 310.02, 340/310.03, 310.05, 310.06, 870.21; 375/37, 36; 326/30; 370/85.1

[56] References Cited

U.S. PATENT DOCUMENTS 4,885,563  12/1989  Johnson et al. ..................... 340/310.05
4,949,359   8/1990  Voillat ................................... 340/310.05

Primary Examiner—Donnie L. Crosland
Attorney, Agent, or Firm—Antonelli, Terry, Stout & Kraus

[57] ABSTRACT

A field bus data communications system in accordance with the invention includes a twin lead cable; a plurality of electronic units connected to the twin lead cable with each electronic unit including a current pulse generator which generators current pulse trains modulating current flow on the twin lead cable to produce current flow between the electronic units on the twin lead cable; and each electronic unit having a dynamic clamp circuit coupled to the twin lead cable for limiting alternating current voltage variations which occur on the twin lead cable to below a maximum value.

6 Claims, 2 Drawing Sheets

DATA COMMUNICATION SYSTEM OF THE FIELD BUS TYPE WITH A TWIN LEAD FOR POWER SUPPLY TO CONNECT UNITS AND FOR DATA TRANSMISSION BETWEEN THE UNITS

BACKGROUND OF THE INVENTION

1. Field of the Invention

The present invention regards a data communication system of the so-called field bus type, i.e. having a long twin lead cable to which are connected a number of electronic units which may communicate in that they are supplied with current or voltage from the bus cable and furthermore use this for the data transmission by means of pulse techniques. Such systems would find wide application, e.g. for process control in factories, where signalling may take place selectively directly between the connected units via the bus cable, whereby individual cables between the units and the central control units may be avoided to a large extent.

2. Description of the Prior Art

However the systems developed to date have a number of disavantages. In a system of moderate size the lenght of the bus cable may well be in the order of one kilometer, while a conventional centrally connected system may have a much larger cable consumption with the large installation costs it entails.

The centrally connected systems have the advantage that the connection between the control unit and the individual units "in the field" may be provided in an individually adjusted manner, and generally individual connections will be shorter and many very much shorter than the corresponding bus cable. This relatively greater length of a bus cable has given rise to noticeable problems in the known field bus cable systems. Hence there may in particular in long cables be noticeable disturbances caused by common mode inteference, i.e. where a current is induced in the cable because of external influences which has the same magnetic field direction in both the conductors in the cable. Those units which are receptive in the system continuously check the cable for signals with a special address to the individual units, and in the case of error signals serious errors may occur, both regarding the address and the content of the subsequent information signal. It is known that a transformer may be used at each unit for suppressing these error signals, viz. a balanced transformer with two primary coils in series regarding high frequencies which normally cooperate but which in case of common mode interference will give rise to oppositely directed magnetic fields from the two coils whereby the error signal is suppressed. The merthod may be efficient.

SUMMARY OF THE INVENTION

According to the invention a much cheaper and much more appropriate solution will be provided. According to the invention consistent use is made of connection units, so-called nodes, with constant current consumption, i.e. with a high load impedance across a similarly high current supply impedance, whereby this pattern is only broken during signal transmission from a unit. The transmission signal is provided by controlled variation of the current consumption, e.g. of ±5 mA whereby corresponding voltage variations, dependent on the impedance of the cable, are impressed on the cable, e.g. in the order of ±250 mV. The data signals are made of these differential voltage pulses which are detected in the detector parts of the units.

The signal transmitting units may themselves be supplied with means for measuring the induced voltage change and to control the current change in reaction thereto, in case the voltage change is less than a desired value, which may in particular be relevant to comparatively snort bus cables.

In transmission cables it is usual to terminate free cable ends by a resistor having the same value as the characteristic impedance which is done in order to prevent disturbing signal reflections from the ends of the cable. This function is important, but when the cable as in the present case is also used for the supply of power to the units connected to it and there is a noticeable voltage of e.g. 24 V between the two conductors, the said resistors function as heating elements, which constantly consume electrical energy. It is already known that this calamity may be avoided by connecting a large capacitor in series with the resist or to disconnect the DC component, but in practice it turns out that such a cable termination by many installation technicians is not understood and an unneccesary expense, and the possibility for error is created during installation. According to the invention it is desrcibed below how this disadvantage may be conteracted in a simple way, which will be an important contribution towards a system which will work well in practice.

It is a condition for the practical usefulness of a system of this kind that it will not give rise to discharge causing a fire when a cable is cut, and in this respect the considerable length of a field bus cable must be considered. A cable is inductive in proportional to the length of the cable, and it contains an energy which is equal to the square of the current in the self inductance times the self inductance. Upon cutting of the cable, a high voltage may be induced which may rise and discharge as an electric arc, i.e. to cause ignition of the surrounding material. It could be stated that a system of this kind would be useless in practice if it carried this risk, and it is hence a part of the invention that a simple solution to this problem is provided.

A short circuit caused by a cut cable may give rise to a discharge which may be dangerous, in particular in an explosive environment. Electronic equipment for use in explosive environments may either be mounted in an explosion-proof enclosure or may be made in a self-protective manner. Which means that the equipment is incapable of producing a flash with sufficient energy to ignite an explosive atmosphere.

The self-protective equipment is fed from a power supply mounted in a non-explosive area, and the voltage and current of the power supply are limited so that a short circuit or disconnection will not cause an explosion. However, it must be taken into account that the maximum short circuit current is equal to the sum of the current that the various connected units may contribute, because these units via their capacitances may represent a considerable current discharge potential. In this very important area the invention also provides an advantageous solution as described in the following.

Usually the problem of potential explosions in self-protective systems of the field bus type is solved by fitting resistors in connection with a capacitor which establishes an AC connection to the primary of the transformer in the measuring unit (the transformer which suppresses common mode interference). These resistors discharge the capacitor so that its energy cannot constitute discharge problem. Provided there is impedance matching between units and the field bus cable, a construction in the form of a constant current system and signalling by means of modulation of the current consumption of each individual unit, it is according to the invention possible to obtain complete safety by just a series connected diode in the connection. This is possible because the diodes will during normal use always be biased for conduction. With a view to fulfil particular standards which require safety even if a simple component should fail, two diodes may be connected in series. Viewed as a whole the invention will have provided all the required countermeasures against the disadvantages that may occur by using the comparatively long bus cables which often have to pass via areas which are liable to catch fire or which are explosive. By means of the invention an overall solution is provided which may give the systems of the kind discussed practical wide acceptance.

BRIEF DESCRIPTION OF THE DRAWINGS

The invention is described in detail in the following with reference to the drawing, in which.

DESCRIPTION OF THE PREFERRED EMBODIMENTS

Figure 1:
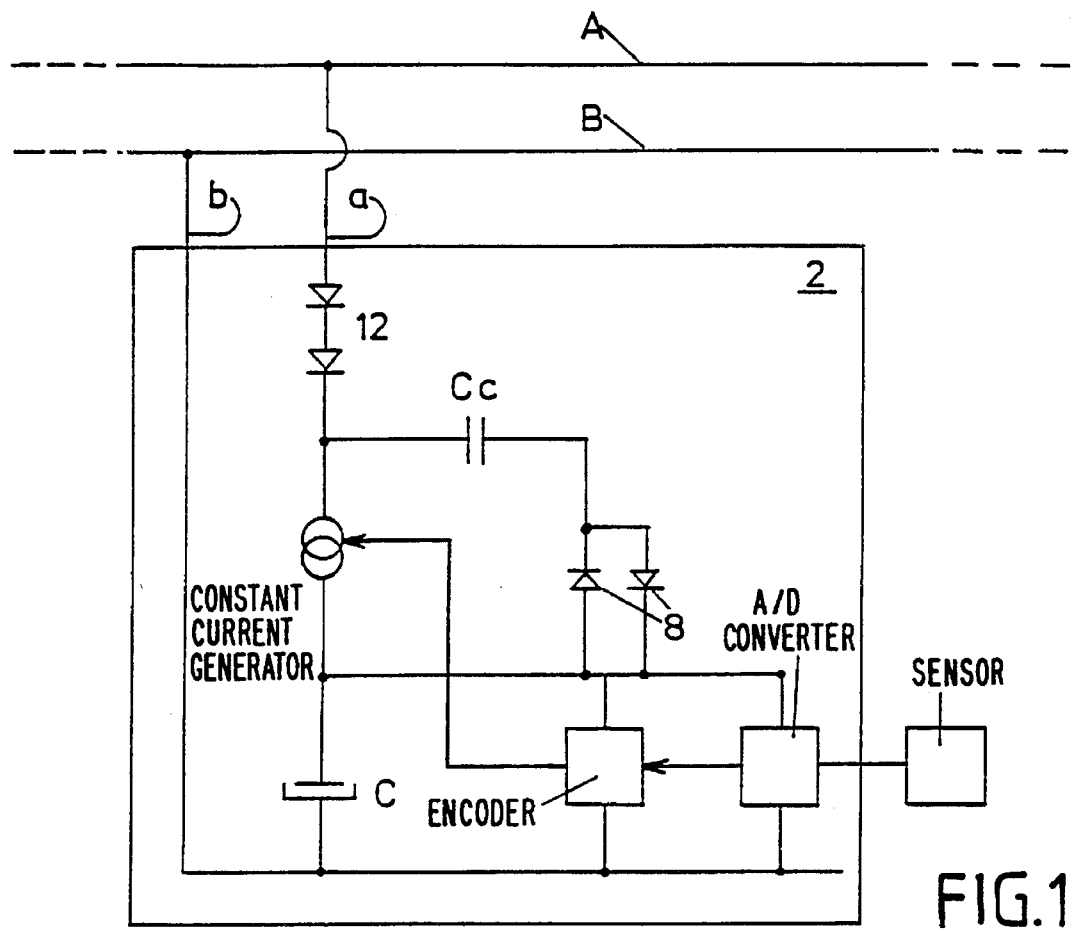
FIG. 1 shows an electronic unit according to the invention with connection to the bus cable.

In FIG. 1 is seen a schematic reproduction of an electronic unit according to the invention. The electronic unit 2 is connected to the field bus cable A, B via the leads a, b. It is a so-called "multidrop system" which means that apart from a constant current unit which provides an essentially constant current to the field bus cable (i.e. with a high generator impedance), a number of electronic units are connected. Which may communicate with each other. This occurs by modulation of the current consumption of each individual unit in a suitable code and at a high frequency by means of a current generator G built into the unit 2 being controlled by an encoder E. The encoder receives digitized signals from an A/D converter A which represents measuring data from a measuring unit or sensor 4. The electronic components are supplied from the field bus cable via a capacitor C. This capacitor would be able to be discharged by short-circuiting the field bus cable A, B but this is prevented by the diodes 12 which block when the voltage on the lead a becomes less than the voltage of the capacitor. Transmission cables for units having a high impedance should normally be terminated by a resistor of the same value as the characteristic impedance of the cable. For transmission technicians this is obvious, but it has to be taken into account that in this case it is a system which is at the same time a power supply system which is typically installed by power technicians, i.e. ordinary electricians. These technicians may not always be counted upon to have an understanding of such special requirements for termination which are furthermore complicated by the fact that many kinds of terminal units may be present in a particular system, and that termination should occur, not only be means of a resistor and a larger capacitor in order to counteract energy losses in the resistor occuring already from a supply voltage of about 24 Volts.

The invention provides an appropriate termination which is built in beforehand in the individual electronic units and which will only function when needed.

This is accomplished by the invention by designing the current supply generator with a high output impedance near the transmission frequency 5 and by each electronic unit being supplied with a dynamic clamp circuit which will counteract sudden voltage variations which are larger than the plus or minus variations for which the clamp circuit is adjusted. On a transmission cable to which is applied a voltage step of e.g. 1 volt a wave will travel with a velocity close to that of light. The voltage pulse will be damped somewhat because of the ohmic resistance of the cable. When the wave arrives at the end of a non-terminated cable the wave will be reflected 100%, and in any point of the cable, at the time of passage of the reflected wave the voltage will be summed with the voltage of a transmitted wave and a reflected wave which generally may give rise to problems because of so-called multiple reflections. If it is assumed that damping by the transmission of the first wave to the termination area is 10%, the voltage at arrival of the wave will be 0.9 V, but following reflection the voltage will double, i.e. 1.8 V. If, however, the cable is terminated with a clamp circut which prevents the voltage from rising above 1 V, the reflected wave will only be 0.1 V (i.e. equal to the damping), and when the reflection arrives back at the generator the voltage rise will be reduced to almost zero, whereby the disturbing multiple reflections will be completely avoided.

Figure 2:
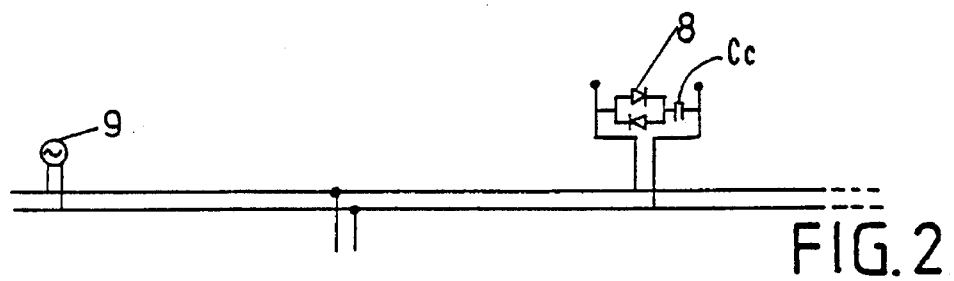
FIG. 2 shows a corresponding diagram for connection of an automatic impedance matching.

This principle is illustrated schematically in FIG. 2, where it is shown that each of the electronic units 2 is supplied at the input with the simplest form of a clamp circuit, namely a pair of diodes 8 wired in antiparallel which via a capacitor discharge any voltage which exceeds the nominal signalling voltage. A wave of 0.1 V may well be reflected, but it will arrive at the generator designated 9 virtually damped to zero, so that the very disturbing multiple reflections will be avoided. Similarly it is shown in FIG. 1 how the coupling capacitor Cc in series with the capacitor C which has a low impedance at the specified frequency together with the diodes 8 constitute the circuit described. During installation of the electronic units 2, 4 there is hence no need to take into account any kind of correct cable termination, and it is an insignificant complication that extra diodes or even a more complex but still standardized clamp circuit have to be fitted in each unit.

This aspect of the invention will obviously be of importance also for other kinds of transmission cables where the operational requirements may be different but where it is still important to terminate the cables using the principles here outlined.

It may be foreseen that error conditions or particular conditions may provoke voltage spikes which in a more or less destructive manner may manifest themselves in an arc which discharges stored energy in the system. This has to absolutely avoided, in particular because many of the systems or parts of systems will be installed in environments which are either a fire risk or explosive. Here use is made of a self-protective system which is typically supplied from a power supply unit which is placed in a non-explosive area, the voltage and current of which are limited so that a short circuit or a break will not give rise to ignition. The maximum short circuit current will be equal to the sum of the currents which each of the connected units will be able to provide to a cable which is short-circuited, based on the capacitive storage of the individual units.

Figure 3:
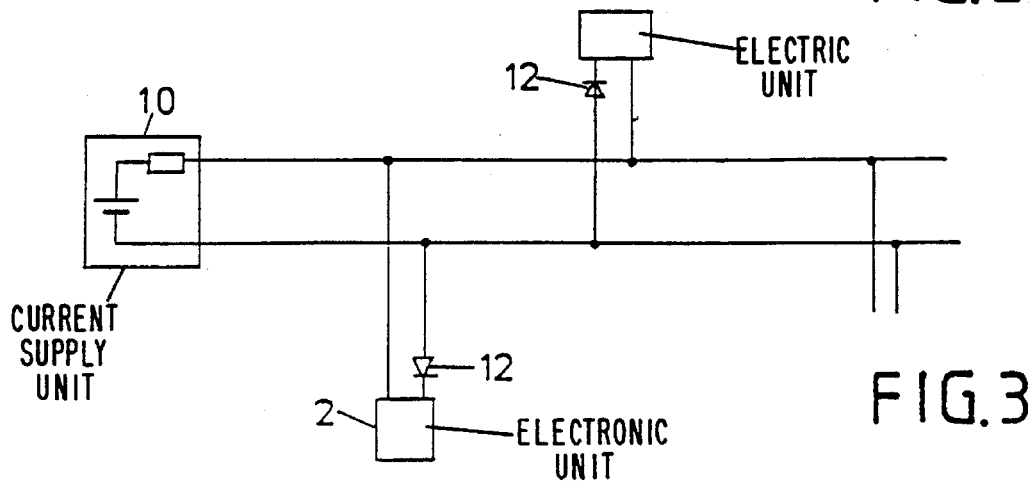
FIG. 3 shows a diagram for illustrating the self-protective bus feature of the invention.
Figure 4:
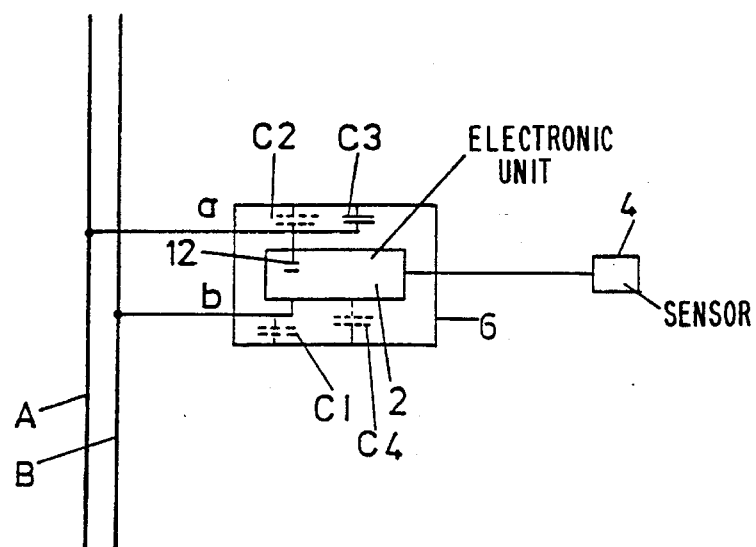
FIG. 4 shows a schematic diagram for illustration of how to obtain a "balanced bus" according to the invention.

According to the invention one or more diodes wired in series with the connectors in each of the units may ensure that the units are unable to contribute a short circuit current. This will hence only be provided by the power supply, and when the extra contributions are removed it may work with a higher permitted current which makes it feasible to connect an increased number of electronic units. The principle is shown in FIG. 3 where the current supply unit is designated 10 and the diodes are designated 12. In FIG. 4 It Is shown that such a diode may be fitted as a standard component in the unit 2.

Since the transmission is based upon a variation in current consumption, but always with the current in the same direction, the diodes will not inhibit this function but only reduce the voltage to the individual units by typically ca. 0.5 V per diode.

In FIG. 4 is shown an electronic unit 2 which is connected via wires a and b to a field bus cable A, B and which is designed to transmit and/or receive impulse modulated signals through the wires a and b. This may be a transmitting unit for the sensor 4, the output signal of which has to be translated to the code used in the system and to be transmitted by means of a particular address to one or more acting units in the system, possibly following a query transmitted from one of these or from a control unit with a particular address to the unit 2. Most of the units will be constantly in stand-by in order to react to a relevant address signal, and there should not be distuarbances which could manifest themselves as false signals.

In order to counteract disturbances caused by the mentioned common mode interference, i.e. voltages in the same direction in the two wires a and b, and A and B respectively the unit 2 is mounted in an electrically conductive housing 6, however without galvanic connection between them, except for a discharge resistor. Between the local ground which is connected to the wire b and this housing 6 there will be a capacitance which is represented by C1, while there between the same housing and the wire a will be a capacitance C2 which is normally much smaller than C1. According to the invention there is interposed between the wire a and the housing 6 a capacitor C3 which of a value C1 minus C2, in order that $C1=C2+C3$. Thereby there will be the same capacitance with respect to the housing 6 for the two wires a and b, whereby a common mode interference will be balanced out. It should be noted that according to circumstances it may be desirable to fit the supplementary capacitor between local ground and the housing 6 which is represented in FIG. 4 by a capacitor C4. This very simple measure is based on the principle that the invention uses electronic units which exclusively appear as constant current consumers, i.e. have a high input impedance. Hence it is possible to function without the special transformer mentioned above and to use the extra capacitor whereby it becomes possible to integrate the circuit on a semiconductor chip.

Even if the electronic units may be self-protecting in themselves it has, however, to be taken into account that the cable itself is inductive so that a break may induce a very high voltage, the higher, the longer the cable is. The permissible cable length will be limited to such a value that a break cannot provoke an efficent arc. In particular when use is made of a maximum current the permissible length may be determined fairly precisely, and it has been determined that this problem is felt already in semi-large installations.

Figure 5:
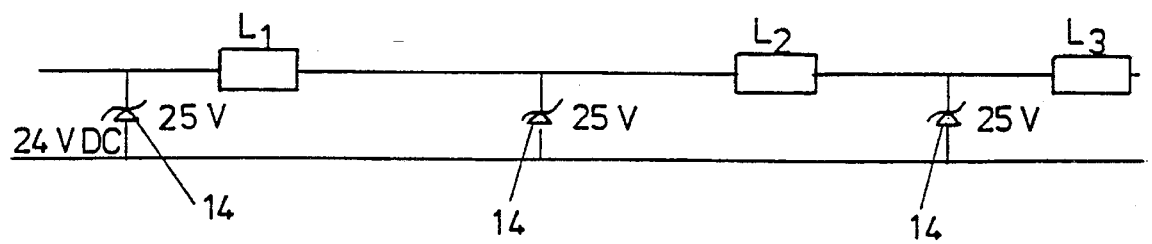
FIG. 5 is a schematic diagram illustrating a damping of the self-inductance of the bus cable.

According to the invention the problem is counteracted by dividing a fairly long bus cable for a prospective of total inductance into two or more partial cable lengths, each being permissible, by fitting zener diodes or a similar voltage limiter at corresponding distances along the cable between the conductors, with suitable account taken of the normal voltages present. By a break there can only appear an energy discharge corresponding to the self-inductance of the stretch of cable between neighbouring diodes, because these will limit the voltage rise on both sides of the affected partial length. There will be a current peak in each of the partial stretches, but the voltage contributions will not be summed, because they will be discharged through the diodes. The principle is illustrated in FIG. 5 where the self-inductances of the partial stretches of cable are marked as L1, L2, and L3, whereas the diodes are marked 14. As indicated their cut-in voltage may be somewhat higher than the operation voltage.

I claim:

1. A field bus data communication system comprising:

a twin lead cable;

a plurality of electronic units connected to the twin lead cable, each electronic unit including a current pulse generator which generates current pulse trains modulating current flow on the twin lead cable to produce current flow between the electronic units on the twin lead cable; and wherein each electronic unit is contained in a conductive housing having at least one capacitor coupled between the conductive housing and the electronic unit which equalizes capacitance between the conductive housing and respective terminals of the electronic unit and has a dynamic clamp circuit coupled to the twin lead cable for limiting alternating current voltage variations on the twin lead cable to be below a maximum value to minimize reflections on the twin lead cable and has a pair of diodes coupled in an anti-parallel configuration to each other with the anti-parallel configuration having terminals electrically coupled between the twin lead cable.

2. A field bus data communication system in accordance with claim 1 wherein each dynamic clamp circuit further comprises:

a capacitor connected in series with the anti-parallel configuration with a first terminal of the capacitor being coupled to one cable of the twin lead cable and a second terminal of the capacitor being coupled to a first terminal of the anti-parallel configuration and a second terminal of the anti-parallel configuration being coupled to another cable of the twin lead cable.

3. A field bus data communication system comprising:

a twin lead cable having a plurality of sections;

at least one electronic unit connected to each section of the twin lead cable, each electronic unit including a current pulse generator which generates current pulse trains modulating current flow on the twin lead cable between electronic units on the sections of the twin lead cable;

at least two voltage limiters coupled between different ends of at least one of the plurality of sections of the twin lead cable with the voltage limiters limiting a voltage rise on the twin lead cable caused by discharging a self-inductance of at least one section of the twin lead cable; and wherein each electronic unit has a dynamic clamp circuit coupled to the twin lead cable for limiting alternating current voltage variations on the twin lead cable to be below a maximum value to minimize reflections on the twin lead cable.

4. A field bus data communication system in accordance with claim 3 wherein:

each electronic unit is contained in a conductive housing having at least one capacitor between the conductive housing and the electronic unit which equalizes capacitance between the conductive housing and respective terminals of the electronic unit and has a pair of diodes coupled in an anti-parallel configuration to each other with the anti-parallel configuration having terminals electrically coupled between the twin lead cable.

5. A field bus data communication system in accordance with claim 3 wherein each dynamic clamp circuit further comprises:

a capacitor connected in series with the anti-parallel configuration with a first terminal of the capacitor being coupled to one cable of the twin lead cable and a second terminal of the capacitor being coupled to a first terminal of the anti-parallel configuration and a second terminal of the anti-parallel configuration being coupled to another cable of the twin lead cable.

6. A field bus data communication system in accordance with claim 4 wherein each dynamic clamp circuit further comprises:

a capacitor connected in series with the anti-parallel configuration with a first terminal of the capacitor being coupled to one cable of the twin lead cable and a second terminal of the capacitor being coupled to a first terminal of the anti-parallel configuration and a second terminal of the anti-parallel configuration being coupled to another cable of the twin lead cable.

* * * * *